United States Patent
Caldwell

[15] 3,659,426
[45] May 2, 1972

[54] CABLE LAYING PLOW

[72] Inventor: Robert H. Caldwell, P. O. Box 403, Jacksonville, Ill. 62650

[22] Filed: Mar. 26, 1970

[21] Appl. No.: 29,337

[52] U.S. Cl..............................61/72.6, 172/699, 172/771, 37/193
[51] Int. Cl....................................B63b 35/04, A01b 13/08
[58] Field of Search..................172/699, 720, 771; 37/193; 61/72.6

[56] References Cited

UNITED STATES PATENTS 3,390,533  7/1968  Gremillion............................172/19 X
3,561,222  2/1971  Sweeton et al........................37/193 X
3,559,414  2/1971  Pike et al..............................37/193 X
27,285     2/1860  Griffin et al..........................172/699 X Primary Examiner—Robert E. Pulfrey
Assistant Examiner—Stephen C. Pellegrino
Attorney—Rummler & Snow

[57] ABSTRACT

A plow for laying service cable underground beneath a sodded surface. The plow includes a leading cutting edge which is contoured along its height so that the upper cutting portion edge for cutting sod is inclined at an obtuse angle relative to the sod as the plow slices therethrough. The lower edge portion for forming a trench is integral with and disposed rearwardly of the upper sod cutting edge portion and inclined in the opposite direction.

2 Claims, 6 Drawing Figures

PATENTED MAY 2 1972 3,659,426
FIG-1
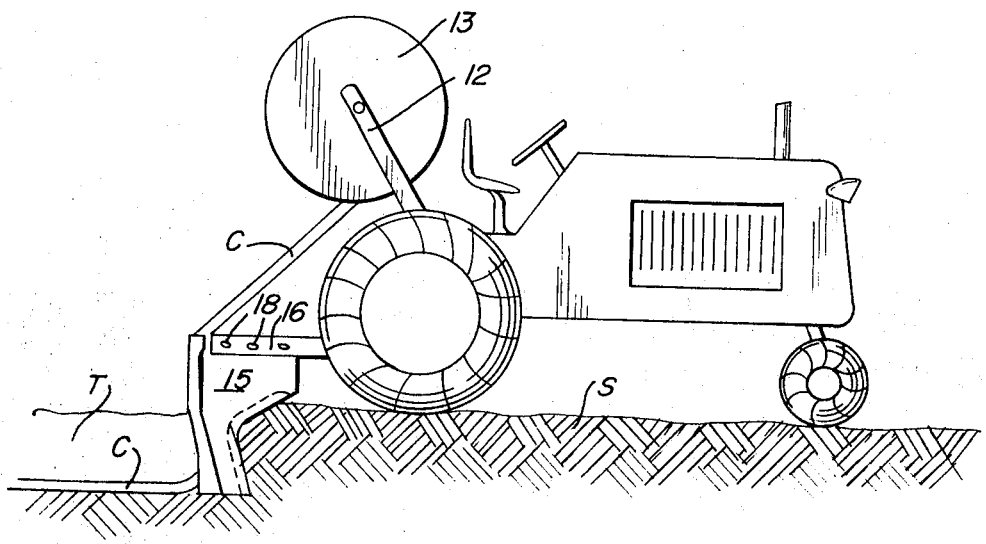
FIG-2 FIG-3 FIG-4
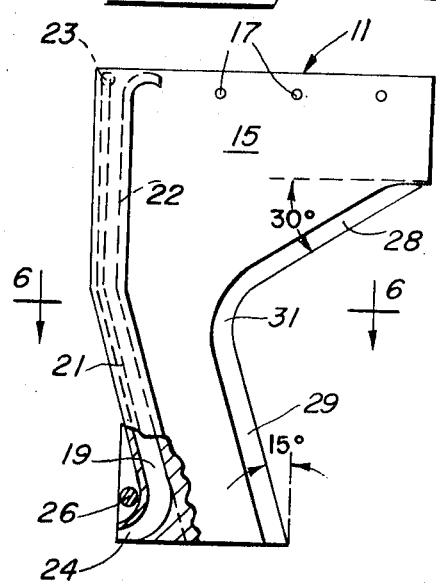 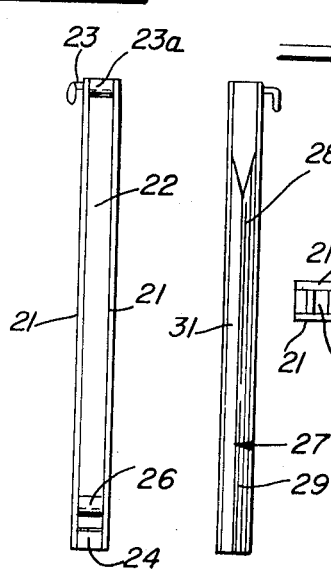
FIG-5
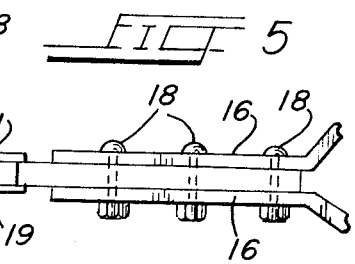
FIG-6
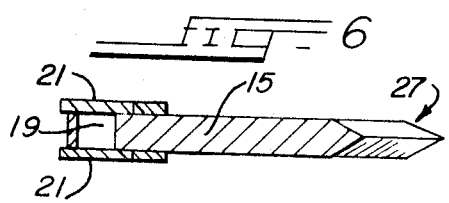
INVENTOR.
ROBERT H. CALDWELL
BY Rummler & Snow
ATTYS.

CABLE LAYING PLOW

BACKGROUND OF THE INVENTION

The present invention relates to plows and more particularly to a plow for laying utility service cable, such as telephone and electric service cable, underground beneath a sodded surface. Also, this invention may be used in plowing-in flexible pipe for multiple uses.

There are a number of the aforementioned plows currently being marketed. These prior art plows are generally characterized by having a leading plow edge and a cable laying groove at the trailing edge. The cable is fed through the groove and into the bottom of the trench or slit made by the plow edge.

Heretofore, in one general type of cable laying plow, the blade is formed with an edge having a length which is disposed transverse to the plowing direction. The transverse edge digs a slit or trench substantially the same width as the plow blade. The plow blade digs into the sod and turns up the soil so that the sod is destroyed. In another type of plow blade, a knife edge is formed on the leading edge. These plows are contoured along their leading edge so that the soil is thrown upwardly out of the trench and forwardly of the edge cutting through the sod. This structure is also unsatisfactory because it also heaves the soil up through the sod before the latter is cut so that a width of the sod substantially equal to about the width of the plow is destroyed.

To avoid destroying the sod, more recent prior art devices have employed movable, as for example rotary or oscillating, cutting blades to cut the sod before forming the trench. These devices are generally spaced from the plow and are of more complex structure and accordingly are more expensive to manufacture. Moreover, as is well known, movable earth digging equipment is more susceptible to breakdown.

SUMMARY OF THE INVENTION

By the present invention, it is proposed to provide a new and improved cable laying plow which overcomes the difficulties encountered heretofore in destroying the sod during cutting.

It is a further object to provide a cable laying plow with a unitary cutting blade having a sod cutting portion and an integral trench cutting portion arranged relative to each other so that the sod is cut prior to digging the trench or slit.

The above and other objects which will be readily apparent from the following specification and claims are accomplished generally by a plow having a leading edge of substantially V-shaped cross-section. The upper portion of the leading edge is formed with a sod cutting edge which is inclined at an angle so that the lower end is disposed in closer proximity to the trailing edge of the plow than the upper end. At the lower end of the plow, the cutting edge is formed with a trench forming edge, which is inclined so that the lower end thereof is spaced rearwardly of that portion of the sod cutting edge which cuts through the sod. The upper end of the slit or trench cutting edge is located rearwardly of the lower end of the sod cutting edge.

BRIEF DESCRIPTION OF THE DRAWINGS

FIG. 1 is a side elevational view of a tractor having the service cable laying plow of the present invention attached thereto.

FIG. 2 is a side elevational view of the blade and also showing the service cable passing on the rear edge of the blade.

FIG. 3 is an end view of the plow as viewed from the left of FIG. 2.

FIG. 4 is an end view of the plow as viewed from the right of FIG. 2.

FIG. 5 is a top fragmentary view of the plow and showing the attachment brackets fastened thereto for attaching the plow to the tractor.

FIG. 6 is a cross section taken on line 6—6 of FIG. 2.

DESCRIPTION OF THE PREFERRED EMBODIMENT

Referring now to the drawings, there is shown a tractor 10 to which there is attached a cable laying plow or blade 11 embodying the structure of the present invention. The tractor 10 may be of any suitable structure capable of supporting the plow 11 thereon. Also supported on the tractor 10 is a cable laying reel support assembly 12. The reel support assembly rotatably supports a reel 13 on which cable C, such as electric, telephone or other service cable, is wound.

The cable laying plow 11 includes a plow blade 15 made from a suitable hardened steel plate or the like. The plow blade 15 includes an upper marginal edge which is fixed to horizontally extending plow attaching straps 16 projecting from the rear of the tractor 10 as shown in FIG. 5. The straps 16 include openings which are aligned with complementary openings 17 in the plow blade 15 and receive fastening bolts 18.

A cable guiding passage 19 is formed along the trailing edge of the plow 11. As shown in FIGS. 2–6, the passage 19 is defined by a pair of plates 21—21 welded along the trailing sides of the plow blade 15. The plates 21—21 are connected along the outer projecting ends by an enclosure plate 22. A removable pin 23 is mounted between the plates 21—21 adjacent the upper end thereof. The spacer sleeve 23a spaces the plates 21—21. Adjacent the lower end, the guide passage 19 is inclined slightly forwardly and rearwardly curved so as to provide a rearwardly directed exit 24 at the lower end of the blade 15. A pin 26 is fixed, as by welding, between the plates 21—21 at the lower rear end thereof.

The leading edge of the plow blade 15 is formed with a cutting edge 27 starting at a point spaced below the attachment. As shown in FIG. 6, the cutting edge 27 is of substantially V-cross-section. It is to be understood that separate cutting members may be fastened to the blade rather than forming the cutting edge 27 integral with the blade 11, as shown.

The cutting edge 27 includes an upper inclined portion 28 which is inclined forwardly relative to the pulling force exerted by the forward movement of the tractor 10 as shown in FIG. 1 and a lower rearwardly inclined portion 29. The upper cutting edge and the lower cutting edge are connected by a concave section 31. It is to be noted that the upper cutting edge portion 28 is inclined so that the lower end thereof is disposed away from the direction of pull while the lower cutting portion is inclined in the opposite direction. This causes two opposing movement arms to be imposed on the attachment arms 16 so that the plow blade 15 remains in the ground during the digging of a trench T.

More significantly, it is to be noted that substantially the entire length of the upper cutting edge 28 is disposed forwardly of the lower cutting edge 29. Thus, the upper cutting edge 28 serves as a sod cutting edge and slices or cuts the sod S overlying the ground before the trenching is performed by the lower cutting edge 29. This arrangement results in requiring a lower pulling force, while simultaneously making a clean cut through the sod S as the tractor moves forward.

When the lower cutting edge throws or forces the dirt underlying the cut sod upwardly, little tearing and minimum upheaval of the sod S occurs. This is important to the average homeowner because the sod may be returned substantially intact after the cable is laid in the trench. The unsightly appearance or lawn repatching required heretofore is thereby eliminated. As the sod is being cut and the trench is dug, the cable C is laid in the trench T in the usual manner.

More specifically, I prefer the cutting edge 28 to be on an angle of about 30° from the horizontal, as shown in FIG. 2, while the lower cutting edge 29 be on an angle of about 15° from the vertical. I also prefer the concave section 31 to have about a 3¼-inch radius to relate a smooth cutting surface from the upper edge of the upper cutting surface 28 to the lower edge of the lower cutting surface 29.

I claim:

1. A plow for forming a trench in the soil and laying a cable or the like in said trench comprising a thin blade for forming said trench, said blade extending generally perpendicular to the longitudinal extent of the trench and having a leading edge and a trailing edge, a channel formed in said trailing edge for receiving and guiding said cable or the like to lay it in the trench, said leading edge comprising a continuous cutting edge having an upper portion and a lower portion of approximately equal effective earth cutting length, said upper portion extending rearwardly and downwardly in a generally straight line and said lower portion extending forwardly and downwardly in a generally straight line, said upper portion making an angle to a line perpendicular to the longitudinal extent of said trench which is greater than the angle which the lower portion makes to said perpendicular line and the lower end of the lower portion terminating rearwardly of the upper end of said upper portion, the upper portion entering the earth at a point in advance of the lower end of said lower portion so that the trench is formed with no more than a small amount of soil upheaval.

2. A device as claimed in claim 1, in which said angle of said upper portion is about 60° and said angle of said lower portion is about 15°.

* * * * *